Oct. 28, 1958  W. R. MATSON ET AL  2,857,878
APPARATUS FOR TINNING TERMINALS
Filed Oct. 28, 1954
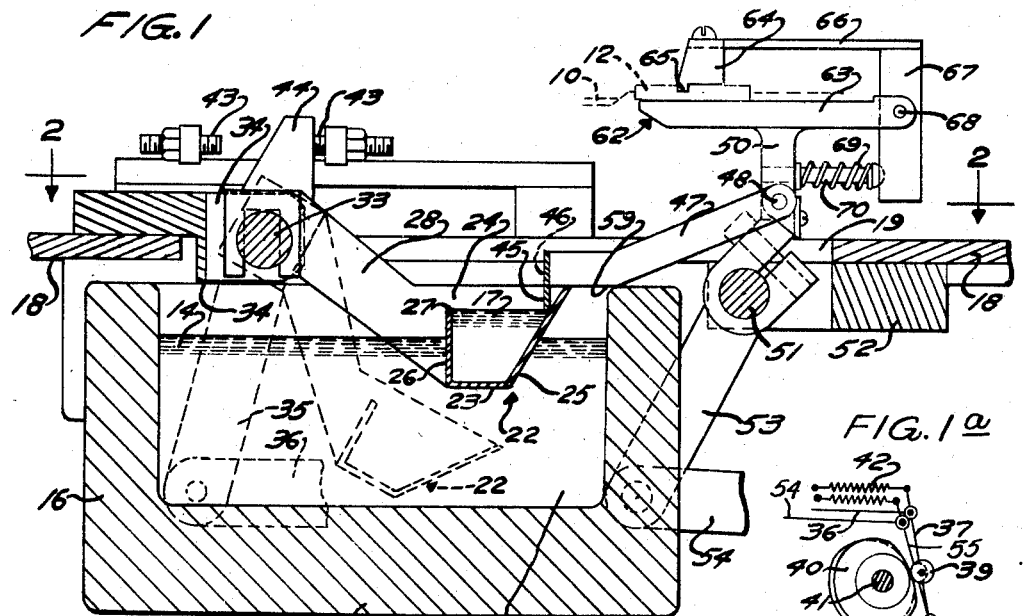
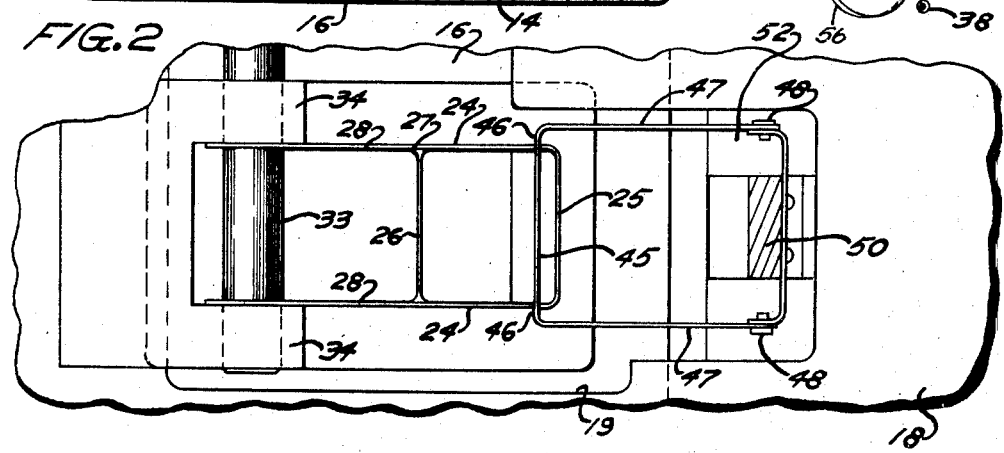
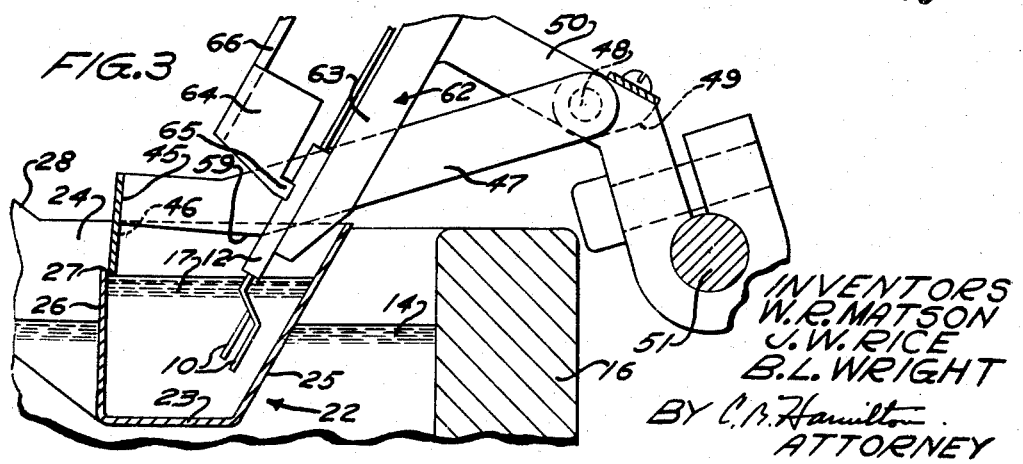
INVENTORS
W. R. MATSON
J. W. RICE
B. L. WRIGHT
BY C. B. Hamilton
ATTORNEY

2,857,878
APPARATUS FOR TINNING TERMINALS

William R. Matson, Oak Park, James W. Rice, Hinsdale, and Ben L. Wright, Des Plaines, Ill., assignors to Western Electric Company, Incorporated, New York, N. Y., a corporation of New York Application October 28, 1954, Serial No. 465,278

5 Claims. (Cl. 118—421)

This invention relates to apparatus for tinning articles and more particularly to a device for dipping terminals of electrical parts into and retracting them from a pool of molten solder from which the dross has been removed.

An object of the invention is to provide an efficient automatic device for coating articles.

Another object of the invention is to provide an improved mechanism for supplying a dross-free pool of molten metal and for dipping parts thereinto to coat them.

A device illustrating certain features of the invention may include a solder pot for holding a supply of molten metal and in which a dipper is mounted for movement from a normal lower position submerged in the molten metal to an upper position to raise a pool of the molten metal above the supply to a predetermined level in engagement with a scraper member which is movable across the upper surface of the pool to remove the dross therefrom. The scraper member is connected to and movable in advance of a pivoted article holder which is movable in timed overlapped relation to the dipper from a normally upper position to a lower position to dip the terminals of the article into the pool of molten metal to coat them and which is movable back to its upper position to remove the coated terminals from the pool. The movement of the dipper, dross scraper, and article holder occur in overlapped relationship so that during a predetemined interval of the operation of the device the dipper, scraper, and article holder are all in motion.

Other objects and advantages of the invention will become apparent by reference to the following detailed description and the accompanying drawings illustrating a preferred embodiment thereof, in which Fig. 1 is a fragmentary vertical longitudinal sectional view of the article tinning apparatus showing the dipper thereof in full lines in its upper position and in dotted lines in its lower position;

Fig. 1a is a fragmentary diagrammatic view of the drive mechanism for the apparatus;

Fig. 2 is a fragmentary plan sectional view taken on the line 2—2 of Fig. 1; and Fig. 3 is an enlarged fragmentary vertical sectional view of the device showing the terminals of an article in tinning position in the raised dipper of molten tin.

The present device was designed to tin a plurality of wire terminals 10 on a wire spring relay component 12 (Fig. 1) by dipping the terminals 10 into a pool of molten solder from which the dross has been removed. A supply of molten solder or other tinnning metal 14 is contained in a receptacle or solder pot 16 which is suitably heated by means (not shown) for maintaining the solder in a molten state. The solder pot 16 is suitably secured to the underneath side of a plate or table top 18 which has an opening 19 therein aligned with the solder pot to permit movement of the terminals 10 of the relay part into the solder pot.

A dipper 22 is disposed in the solder pot 16 for movement from a normal lower submerged position in the solder as shown in dotted lines in Fig. 1 to an upper position, shown in full lines, for dipping a pool or predetermined quantity of molten solder and raising it to a predetermined level. The dipper 22 is formed from sheet metal and has a bottom wall 23, a pair of end walls 24, a sloping side wall 25 extending from the bottom wall coextensively with the end walls and a vertical shorter side wall 26 with the upper edge 27 thereof disposed below the upper edges of the side and sloping walls 24 and 25 respectively, when the dipper is in its upper position. The dipper 22 has laterally extending arms 28 formed integral with the end walls 24, which arms 28 are fixed to a rock shaft 33 supported in bearings 34 mounted on the table top 18. An arm 35 fixed to the shaft 33 is pivotally connected at its lower end to one end of a link 36, the other end of which is connected to an actuating lever 37 as shown diagrammatically in Fig. 1a which is fulcrumed at 38 and has a cam roller 39 thereon engageable with a cam 40. The cam 40 is fixed to a drive shaft 41 and serves to oscillate the dipper 22 from its lower position to its upper position to dip a pool of molten solder and raise it to a predetermined level above the upper level of the supply of solder in the solder pot 16 and with the upper edges of the end walls 24 and the sloping side wall 25 substantially level with the top of the solder pot 16. A spring 42 connected to the lever 37 serves to return the dipper to its lower position in cooperation with the cam 40, and a pair of stops 43 cooperating with the upwardly extending end 44 of the arm 35 serves to stop the dipper in it upper and its lower positions. As the dipper moves to its upper position the excess molten solder in the dipper will flow therefrom over the upper edge 27 of the rear wall 26 and the upper portion of the pool 17 of solder in the dipper will engage the lower edge of a scraper member 45 for scraping the dross from the upper surface of the pool of solder.

The scraper member 45 is in the form of a flat plate or blade extending across the dipper 22 and having reduced end portions forming shoulders 46 which are adapted to engage and be supported on the upper edges of the end walls 24 of the dipper during the operation of tinning the terminals 10 on the relay part 12. The scraper member 45 has a pair of arms 47 formed integral with the ends thereof which arms are pivotally connected at 48 to the ends of a U-shaped bracket 49 secured to an arm 50 which is fixed to a rock shaft 51. The shaft 51 is supported in bearing brackets 52 secured to the table top 18 and has an arm 53 secured thereto, the lower end of which is connected to a link 54. The other end of this link is connected to an actuating lever 55 which is oscillated through a predetermined distance by a cam 56 on the drive shaft 41 in timed relation to the actuation of the dipper 22. The arms 47 of the scraper 45 have portions 59 which engage and are supported on the upper edge of the solder pot 16 when the dipper 22 is in its lower position and which, in response to actuation of the rock shaft 51, ride off of the solder pot and cause the scraper 45 to rest on and be guided for movement on the upper edges of the side walls 24 of the dipper 22, during which movement the lower edge of the scraper 45 scrapes the dross from the upper surface of the pool 17 of molten solder in the dipper.

The rocker arm 50 carries an article holder 62 for supporting the relay part 12 during the tinning operation of its terminals 10. The holder 62 comprises a horizontal plate 63 (Fig. 1) formed integral with the rocker arm 50 and having a flat upper surface for receiving the relay part 12 thereon. A retaining member 64 having a depending rib 65 engageable in a groove in the relay part 12 is secured to one end of a flat leaf spring 66, the other end of which is fixed to a bar 67. The bar 67 is pivotally supported at 68 on the plate 63 and is stressed for rotation in a counterclockwise direction by a spring 69 which is interposed between the lower end of the bar 67 and the rocker arm 50 and encircles a guide rod 70 slidably mounted in a guide aperture in the arm 50.

The relay parts 12, after the terminals 10 have been dipped in a flux bath, may be automatically fed to and removed from the holder 62 in timed relation to the operation of the device by suitable means. In response to the rotation of the drive shaft 41, the dipper 22 will be moved from its lower position to its upper position to dip a pool of molten solder and raise it to a predetermined level, during the latter portion of the movement of which the rocker arm 50 will be oscillated to cause the scraper 45 to be actuated simultaneously with but in advance of the holder 62 from the position shown in Fig. 2 to the position shown in Fig. 3 to scrape the dross from the top of the pool 17 of molten solder in the dipper 22 and to cause the holder 62 to swing the relay part 12 downwardly between the arms 47 of the scraper and dip the terminals 10 thereof into the clean molten solder. The terminals are held in the solder for a predetermined length of time, after which the holder 62 with the part 12 thereon, the scraper 45, and the dipper 23 are returned to their normal positions and the article 12 with tinned terminals 10 is removed from the holder.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. An apparatus for coating articles comprising a receptacle for holding a supply of molten metal, a dipper mounted for movement in said receptacle from a lower position submerged in said molten metal to an upper position to raise a predetermined pool of the molten metal to a predetermined level above the upper surface of the molten metal in the receptacle, a scraper, guide means on said dipper engageable with said scraper and operable when said dipper is in its upper position for supporting said scraper for horizontal movement with the lower portion thereof in engagement with the upper portion of the pool of molten metal therein, means for actuating said dipper to and from its upper position, means for moving said scraper to scrape the dross from said pool of molten metal, and means for dipping the article into said pool of molten metal.

2. An apparatus for coating articles comprising a receptacle for holding a supply of molten metal, a dipper mounted for movement in said receptacle from a position submerged in said molten metal to an elevated position to raise a pool of the molten metal to a predetermined level above the upper surface of the molten metal in the receptacle, a scraper for scraping the dross from said pool of molten metal, guide means on said dipper engageable with said scraper and operable when said dipper is in its upper position for supporting the scraper for horizontal movement with the lower portion thereof in engagement with the upper portion of the pool of molten metal, an article holder pivotally mounted for movement from a normal upper position to a lower position to dip into the molten pool a portion of the article carried by the holder, means extending from said scraper and pivotally connected to said article holder for moving said scraper horizontally on said guide means simultaneously with the movement of said holder, means for actuating said dipper, and means for actuating said article holder.

3. An apparatus for tinning articles comprising a receptacle for holding a supply of molten metal, a dipper pivotally mounted for movement in said receptacle from a normal position submerged in said molten metal to an elevated position to raise a pool of the molten metal to a predetermined level above the upper surface of the supply, a rocker arm pivotally mounted at its lower end for oscillatable movement, a holder for said article mounted on said rocker arm for arcuate movement from an upper position to a lower position adjacent said pool of molten for dipping a portion of the part thereinto, a scraper having a pair of arms extending therefrom on opposite sides of said holder and pivotally connected to said rocker arm, means for supporting said scraper in a predetermined position above the molten metal in the receptacle when said dipper is submerged and for engagement with the dipper end the pool of metal when said dipper is raised to its elevated position, guide means on said dipper engageable with said scraper and operable when said dipper is in its elevated position for supporting the scraper for horizontal movement with the lower portion thereof in engagement with the upper portion of the pool of molten metal, and means for sequentially actuating said dipper and said rocker arm to effect the movement of said dipper to its elevated position and the movement of said scraper across the pool of molten metal to remove the dross therefrom and the lowering of the holder to dip the article into said pool of molten metal.

4. An apparatus for coating articles comprising a receptacle for holding a supply of molten metal, a dipper, means pivotally mounting said dipper for movement in said receptacle from a position submerged in said molten metal to an elevated position to raise a pool of molten metal to a predetermined level above the upper surface of the molten metal in said receptacle, a rocker arm pivotally mounted at the lower end thereof adjacent said receptacle, a holder for said article mounted at the upper end of said arm and movable from a normal upper position to a lower position adjacent said dipper when it is in raised position for dipping a portion of the article into said pool of molten metal, a scraper having a predetermined normal position above the supply of molten metal and in the path of the dipper, means on said dipper for supporting said scraper for horizontal movement in engagement with the pool of molten metal when said dipper is in its upper position, means for pivotally connecting the scraper to said rocker arm for moving said scraper across the pool of molten metal to scrape the dross therefrom in response to movement of said rocker arm, and means for actuating said dipper and said rocker arm in timed relation to each other.

5. In an apparatus for coating articles, a receptacle for holding a supply of molten metal, a dipper mounted for movement in said receptacle from a lower position submerged in said molten metal to an upper position to raise a pool of the molten metal to a predetermined level above the upper surface of the molten metal in the receptacle, a scraper, guide means on said dipper engageable with said scraper and operable when said dipper is in its upper position for supporting said scraper for horizontal movement with the lower portion thereof in engagement with the upper portion of the pool of molten metal therein, means for actuating said dipper to and from its upper position, and means for moving said scraper to skim the dross from said pool of molten metal.

References Cited in the file of this patent

UNITED STATES PATENTS

| | | |
|---|---|---|
| 1,258,071 | Winter | Mar. 5, 1918 |
| 1,572,953 | Pletsch | Feb. 16, 1926 |
| 2,224,578 | Wean et al. | Dec. 10, 1940 |
| 2,234,586 | Bertalan | Mar. 11, 1941 |
| 2,310,162 | Matteson | Feb. 2, 1943 |
| 2,431,135 | Morse | Nov. 18, 1947 |
| 2,545,909 | Zabel | Mar. 20, 1951 |
| 2,611,335 | Dilts | Sept. 23, 1952 |